United States Patent [19]

Aylon

[11] 3,928,114
[45] Dec. 23, 1975

[54] APPARATUS FOR BUILDING OF STRUCTURAL COMPONENTS

[75] Inventor: Norman N. Aylon, Willowdale, Canada

[73] Assignee: General Concrete of Canada Limited, Hamilton, Canada

[22] Filed: Mar. 26, 1974

[21] Appl. No.: 454,792

[52] U.S. Cl. ............... 156/351; 52/747; 156/357; 156/566; 156/362; 156/578; 182/63; 198/21; 198/101; 198/34
[51] Int. Cl.[2] .............. E04G 21/00; E04B 1/00; B65G 37/00; B32B 31/12
[58] Field of Search .......... 156/578, 350, 538, 356, 156/566, 357, 575, 536; 214/66; 198/94, 97, 96, 101, 21, 34; 182/63; 52/747, 749

[56] References Cited
UNITED STATES PATENTS

| | | | |
|---|---|---|---|
| 2,721,645 | 10/1955 | Eberle | 198/101 |
| 2,924,323 | 2/1960 | Holben | 198/34 |
| 3,039,233 | 6/1962 | Holmes | 182/63 |
| 3,513,991 | 5/1970 | McWilliams | 214/6 G |
| 3,528,566 | 9/1970 | Weir | 198/96 |
| 3,641,731 | 2/1972 | Winfree | 52/747 |
| 3,651,963 | 3/1972 | McWilliams | 198/101 |
| 3,723,227 | 3/1973 | Oono et al. | 156/578 |
| 3,817,006 | 6/1974 | Williams | 52/747 |
| 3,817,368 | 6/1974 | Wentz et al. | 198/21 |

Primary Examiner—Douglas J. Drummond
Assistant Examiner—J. J. Gallagher
Attorney, Agent, or Firm—Sim & McBurney

[57] ABSTRACT

Machinery is provided for use in the building of structural panels and includes a first fixed conveyor, an adhesive-applying station situated relative to the fixed conveyor for applying bonding adhesive to concrete blocks from which the structural panels are to be formed, and a second conveyor having a conveying surface for conveying the blocks to which adhesive has been applied to a platform assembly located adjacent a panelization frame, the second conveyor and platform assembly being longitudinally drivably movable in articulated fashion relative to the first conveyor for longitudinal movement of the platform assembly relative to the panelization frame so that an operator may build a structural panel from blocks conveyed to the platform assembly. The platform assembly includes a vertically and horizontally movable platform. The speed of feed of blocks to the second conveyor from the first conveyor is controlled so that a constant but adjustable rate of delivery of blocks at the platform assembly may be provided.

11 Claims, 10 Drawing Figures

APPARATUS FOR BUILDING OF STRUCTURAL COMPONENTS

FIELD OF INVENTION

This invention relates to machinery for the building of structural panels.

CROSS-REFERENCE TO RELATED APPLICATION

In copending application Ser. No. 295,896 filed Oct. 10, 1972, (now U.S. Pat. No. 3855,752) there is described a self-sustaining structural panel useful in the construction of buildings and a masonry block for use in the making of such panels.

BACKGROUND OF THE INVENTION

In the construction of buildings, generally a plurality of individual building blocks is juxtaposed and joined to one another at the building site to provide the requisite structure, for example, a wall.

Prefabricated structural panels have been suggested. However, such prefabricated panels generally either lack structural strength in flexure or buckling resistance or are bulky and unwieldy. The panels of the aforementioned application, however, suffer from neither of these defects and consist of a plurality of courses joined in superimposed manner throughout the height of the panel. Each of the courses consists of a plurality of structural rectangular parallelepiped masonry blocks joined in abutting longitudinal relationship. The blocks in the vertically adjacent courses are offset from one another.

The panels are formed from a family of blocks as described in the aforementioned application, allowing the provision of a plurality of different types of joint with other panels. The majority of blocks in the panel have a central core extending from the top face to the bottom face of the block and a recess in each end face. The opposed recesses in the end face of each two abutting blocks define a void of substantially the same cross-sectional dimension as the central core, the voids coinciding with the central cores of the vertically adjacent blocks in the panel.

A plurality of satellite cores, each extending from the top to the bottom face of the block, is provided in each block, one pair being positioned between the central core and one of the recesses and the other pair being positioned between the central core and the other of the recesses. One member of each pair of satellite cores is closer to one longitudinal edge of the block than the other member. The satellite cores in blocks in vertically adjacent courses coincide with one another and define continuous passages throughout the height of the panel which are out of fluid flow communication with the continuous passages defined by the coinciding voids and central cores. The satellite core-defined passages are capable of receiving reinforcement rods therein for reinforcement of the panel, if desired.

The end blocks of each course are compatible with the other blocks in the course and are appropriately chosen from the set of blocks, which includes, in addition to the blocks described above, a block in which a recess is formed in only one of the end walls and a block of half the length of the others also having a recess only at on end, omitting the central core and having just two satellite cores.

The panels constructed in accordance with this prior invention, while extremely useful in providing satisfactory structural members require labor-intensive and/or time-consuming procedures of production. The blocks require indexing to ensure correct end block form and lateral dimension of the panel, appropriate application of adhesive and building up of the panel to the required height from the blocks to which the adhesive has been applied.

SUMMARY OF INVENTION

The present invention is concerned with machinery allowing mechanization of the procedures involved in the production of structural panels in accordance with the above-mentioned application.

DESCRIPTION OF PREFERRED EMBODIMENTS

Figure 1:
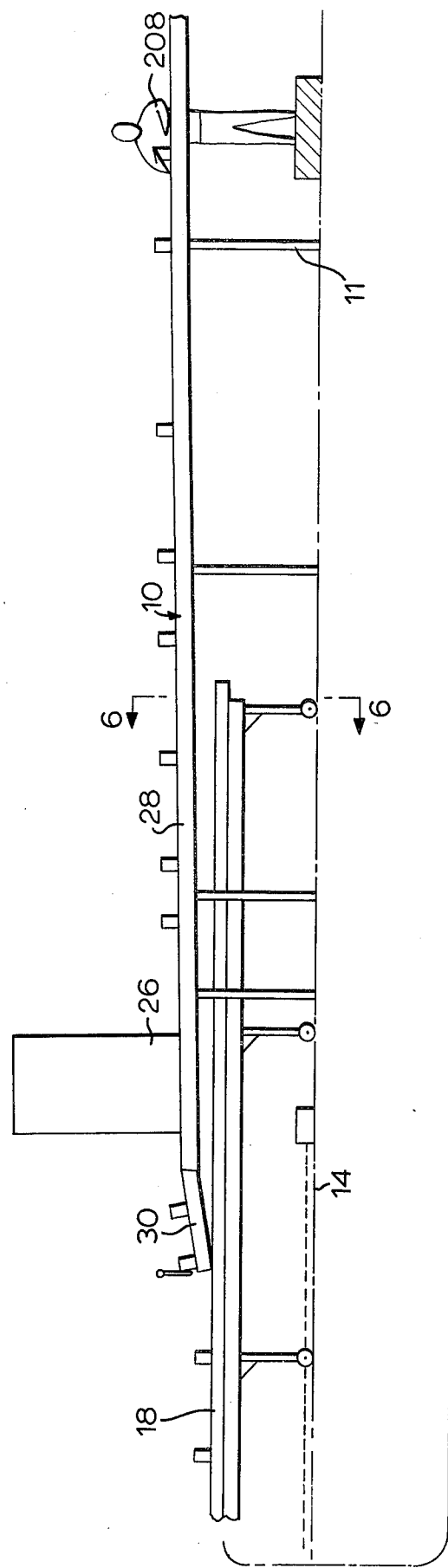
FIG. 1 is a schematic elevational view of an apparatus in accordance with one embodiment of the invention.
Figure 1:
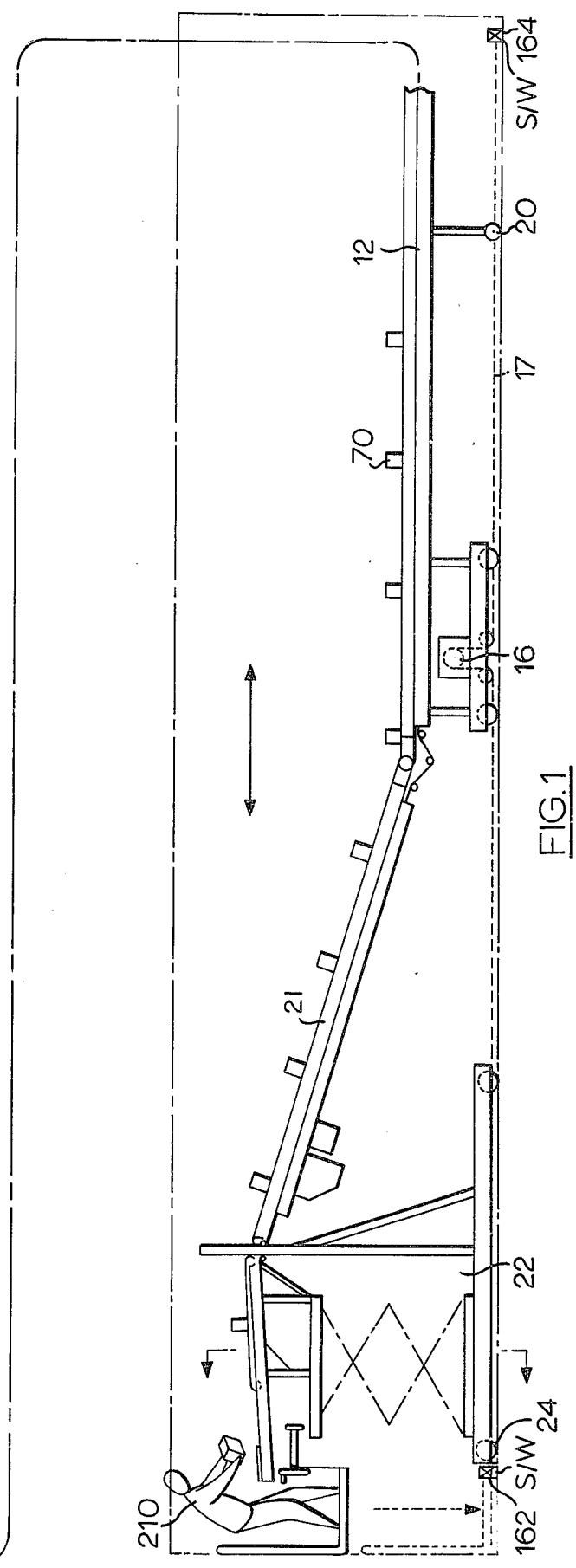
Figure 2:
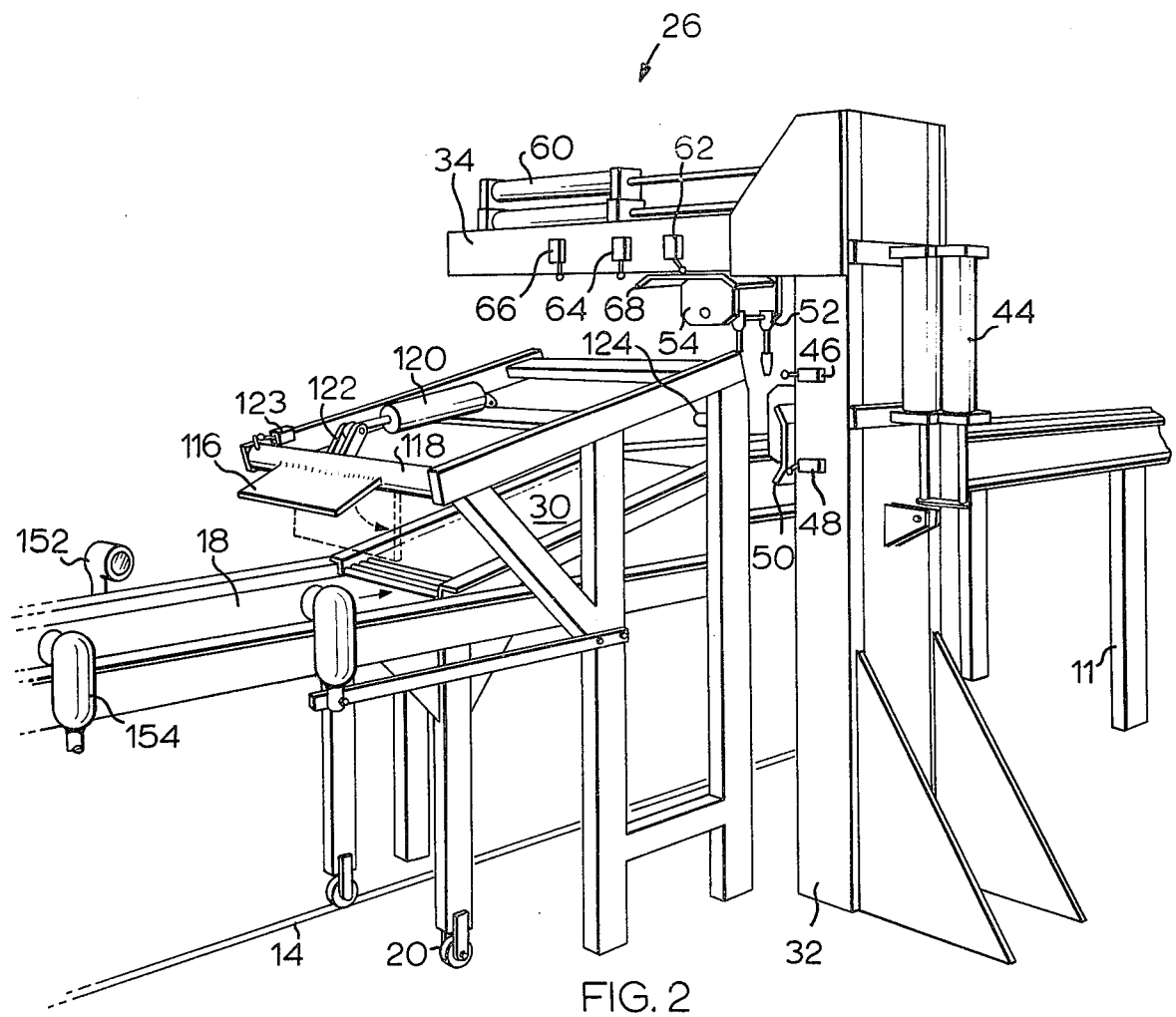
FIG. 2 is a perspective view of an adhesive-applying apparatus for use in the apparatus of FIG. 1.
Figure 6:
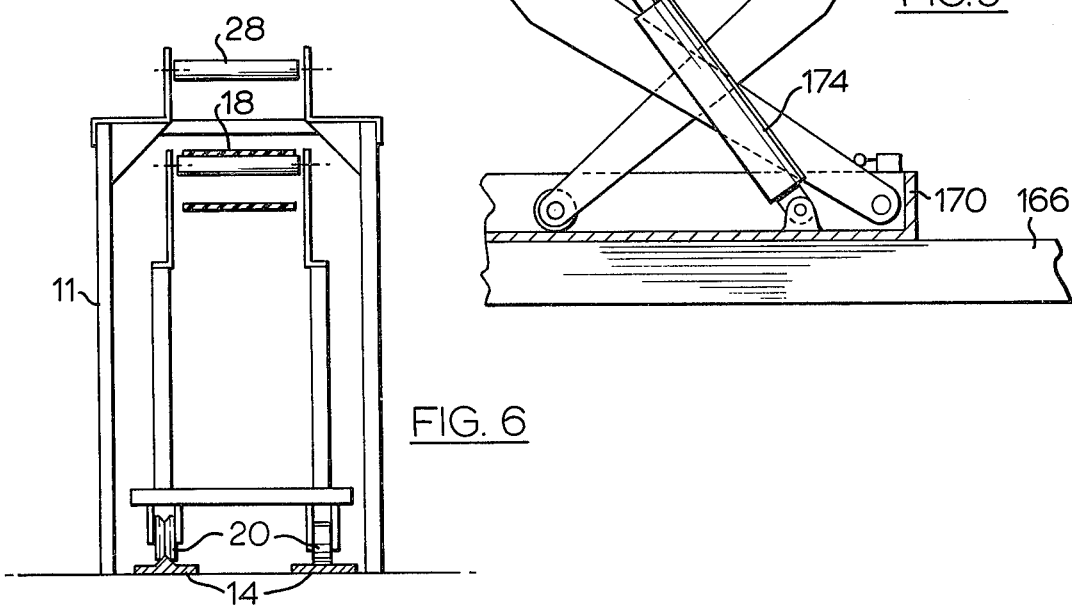
FIG. 6 is a sectional view taken on line 6-6 of FIG. 1.

Referring first of FIGS. 1 and 6, an apparatus for use in the construction of building panels includes a first conveyor 10 for conveying concrete blocks along its length and having a substantially fixed elevated position supported on legs 11, and a second conveyor 12 for conveying concrete blocks along its length, the second conveyor 12 being mounted in any suitable manner on parallel tracks 14 for longitudinal movement along the track 14 upon actuation of motor 16. The second conveyor 12 is located, at least in their adjacent areas, below the level of the conveyor 10. A chain 17 is associated with second conveyor 12 and is located in driving relation with the motor 16.

The movable conveyor 12 includes a substantially horizontal first portion 18 mounted by wheels 20 on tracks 14 and a second portion 21 pivotally mounted relative to the first portion 18 for pivotal movement between a substantially horizontal position to inclined positions. The second portion 21 of the movable conveyor 12 also is pivotally mounted to a platform assembly 22 mounted by wheels 24 on the track 14 so that the platform assembly 22 and the second conveyor 12 are articulated.

An adhesive-applying apparatus 26 for the application of adhesive to concrete blocks is mounted relative to the stationary conveyor 10. The stationary conveyor 10 includes a first portion 28 and a second inclined portion 30 downstream of the adhesive-applying apparatus 26 and inclined downwardly from the downstream termination of the first portion 28 of the stationary conveyor 10 to the horizontal portion 18 of the movable conveyor 12.

The conveyor surfaces of the conveyors 10 and 12 may be provided in any convenient manner. For example, the conveyor 12 may have a driven endless belt or one such belt for each conveyor portion 18 and 21 drivably to convey the concrete blocks from their point of discharge from the stationary conveyor 10 to the platform assembly 22.

The conveyor surface of the conveyor 10 may be in the form of parallel spaced transverse roller elements mounted in free-rolling manner, with the exception of the length thereof immediately upstream of the adhesive-applying station 26 where such rollers are driven, as will become more apparent below in the description of FIGS. 2 to 5. Feed of concrete blocks to the adhesive-applying station 26 may be achieved in this embodiment by gravity through a slight upward incline, from left to right or the surface of the first portion 28 of the conveyor 10 to the driven rollers immediately upstream of the adhesive-applying station 26. If desired, the conveying surface of at least the first portion 28 of the conveyor 10 may be provided as a driven belt or driven rollers.

Usually the conveying surface of the second portion 30 of the conveyor 10 consists of a plurality of parallelly-arranged free-rollingly mounted rollers. However, any other suitable form of conveying surface may be used.

Turning now to consideration of FIGS. 2 to 5, there is illustrated the adhesive-applying station 26, its operation, the second portion 30 of the stationary conveyor 10 and the construction of the conveyor 10 immediately upstream of the adhesive-applying station 26.

The buttering station 26 includes an upright frame member 32 mounted in fixed position on the ground in any convenient manner and a transverse frame member 34 extending substantially perpendicularly to the upright frame member 32 vertically upwardly spaced from and transverse to the conveyor 10.

The upright frame member 32 supports a first pair of adhesive-applying guns 36 for vertical reciprocation relative to the frame member 32. The pair of guns 36 is mounted in spaced-apart relation on a plate 38 having wheels 40 for movement on track 42 situated in the frame member 32.

The reciprocal movement of the pair of guns 36 is actuated by a pneumatically operated piston 44. The piston 44 may be operated in any other convenient manner, for example, hydraulically. The upper and lower extremities of the reciprocal movement of the pair of guns 36 are controlled by limit switches 46 and 48 respectively, which are engaged for actuation by a flange 50 on the plate 38.

The transverse frame member 34 supports a second pair of achesive-applying guns 52 for horizontal reciprocation relative to the frame member 34. The second pair of guns 52 is mounted in spaced-apart relation on a plate 54 having wheels 56 for movement on track 58 situated in the transverse frame member 34.

The reciprocal movement of the second pair of guns 52 is actuated by a pneumatically-operated piston 60. The transverse extremities of the reciprocal movement of the second pair of guns 52 are controlled by limit switches 62, 64 and 66 which are engaged for actuation by a flange 68 on the plate 54. The limit switch 64 usually is inactive and the limit switch 66 defines the lateral extremity of movement of the guns 52. However, where a half length block is to have adhesive applied thereto, then the limit switch 64 defines the lateral extremity of movement of the guns 52.

The limit switches 46, 48, 62, 64 and 66 control the motion and operation of the pairs of guns 36 and 52 so that adhesive is applied thereby to a concrete block 70 only on the side and top thereof adjacent the edges. The adhesive utilized in this operation is any convenient adhesive which will not cure until the block 70 has been laid with other blocks to provide the structural panel but, at the same time, is sufficiently viscous to adhere to the surfaces of the blocks 70 to which it is applied, usually in substantially bead-like form.

The adhesive is fed to the pairs of guns 36 and 52 in any convenient manner and may be discharged therefrom pneumatically upon actuation of a suitable pneumatic device.

Figure 3:
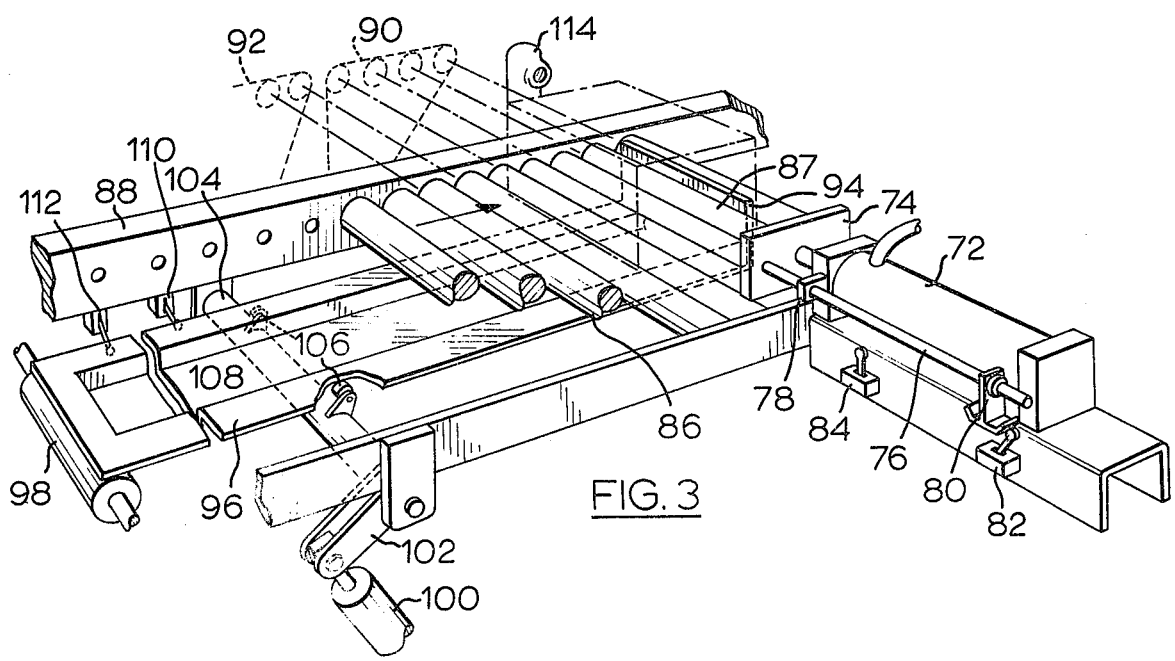
FIG. 3 is a perspective view of part of the feed rollers, with parts removed, immediately upstream of the adhesive-applying apparatus.
Figure 4:
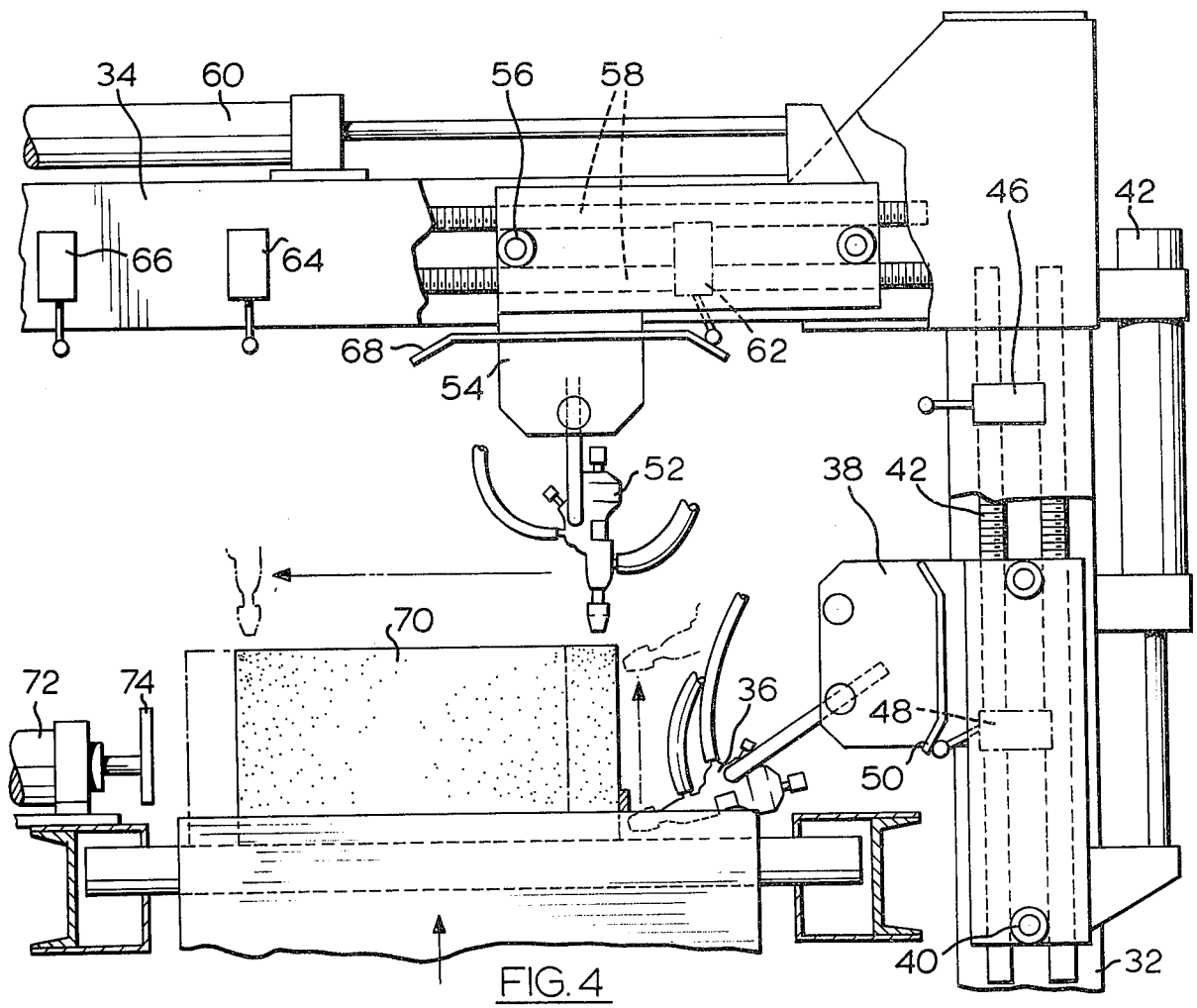
FIG. 4 is an elevational view of the adhesive-applying apparatus of FIG. 2.

As may be seen more clearly in FIGS. 3 and 4, a reciprocating piston 72, actuatable in any convenient manner, typically pneumatically, is attached to a pusher plate 74 which is reciprocated transversely of the conveyor 10 to abut a concrete block 70 which is intended to have adhesive applied thereto. The pusher plate 74 is intended to position a block 70 in its correct position against a suitable stop member for application of adhesive by the pairs of guns 36 and 52. In addition, the pusher plate 74 acts to prevent actuation of the adhesive application in the absence of a block 70.

A rod 76 is fixedly attached to the plate 74, extends longitudinally of the piston 72 and is supported by a bracket 78. A flange 80 is attached to the rod 76 for engagement with limit switches 82 and 84. Normally, upon actuation of the plate 74 the limit switch 82 only is opened, whereas in the presence of a block of half the normal length, the limit switch 84 is actuated, causing actuation of limit switch 64 thereby causing application of adhesive only over the desired lateral width corresponding to the block length.

A pressure switch is provided to be actuated when the block is properly clamped between the pusher plate 74 and the stop member, allowing operation of the adhesive-applying procedure.

The portion of the conveyor 10 at and immediately upstream of the adhesive-applying station 26 consists of rollers 86 and 87 which are mounted for rotation in frame arms 88. The rollers 87, situated directly below the transverse frame member 34 and on which the block 70 sits during the application of adhesive, typically four in number, are driven by a motor (not shown) and drive belt 90. The rollers 86 upstream of rollers 87 are separately driven by a motor (not shown) and drive belt 92. The sets of rollers 86 and 87 usually are driven at differing speeds.

A gate member 94 in the form of a plate is situated at the exit of the adhesive-applying station 26. The plate 94 is attached to a frame 96 which is pivotally mounted by roller 98 to the frame arms 88 for pivotal movement below the rollers 86 and 87 for reciprocation of the plate 94 between a first position wherein a portion thereof projects above the plane of the top surface of the rollers 87 and thereby prevents movement of a block 70 downstream of the adhesive-applying station 26 and a second retracted position wherein the plate 94 is wholly below the plane of the top surface of the rollers 87 and thereby allows a block 70 to move downstream of the adhesive-applying station 26.

The movement of the frame 96 between the two positions is controlled by a pneumatically operated piston 100 through crank arms 102, transversely-mounted rod 104 and rollers 106 engaging the arms of the frame 96 and mounted on flanges 108 on the rod 104. Limit switches 110 and 112 engagable by parts of the frame 96 are actuable at the upper and extremities, respectively, of movement of the plate 94.

A first photoelectric cell 114 is mounted on the frame 88 with a line of sight immediately upstream of the plate member 94 to sense the positioning of the block 70 in the adhesive-applying station 26. While a photoelectric cell 114 is illustrated, any other desired block-sensing means may be used.

The downwardly-sloping portion 30 of the conveyor 10 allows a block 70 to which adhesive has been applied and after discharge from the adhesive-applying station 26 to be fed to the conveyor 12. An escapement plate 116 is positioned adjacent the downstream end of the conveyor portion 30 and is mounted on a rotatable roller 118. The roller 118 is rotatable under the action of pneumatically-controlled piston 120 through crank flange 122 to move the plate 116 between a downwardly-depending position, shown in dotted outline in FIG. 2, wherein a block 70 positioned on the conveyor portion 30 is prevented from passing from the conveyor 10 to the conveyor 12, and a second position, shown in full outline in FIG. 2, wherein a block 70 positioned on the conveyor portion 30 may pass to the conveyor 12 without hindrance from the plate 116, the movement of the escapement plate 116 being actuated by a block passing a downstream photocell and being closed by limit switch 123.

A second photocell 124, or other convenient sensing means, is positioned relative to the conveyor portion 30 for sensing the presence of a block 70 on the conveyor portion 30 thereby signifying vacation of the adhesive-applying station 26 for the next block 70.

Figure 10:
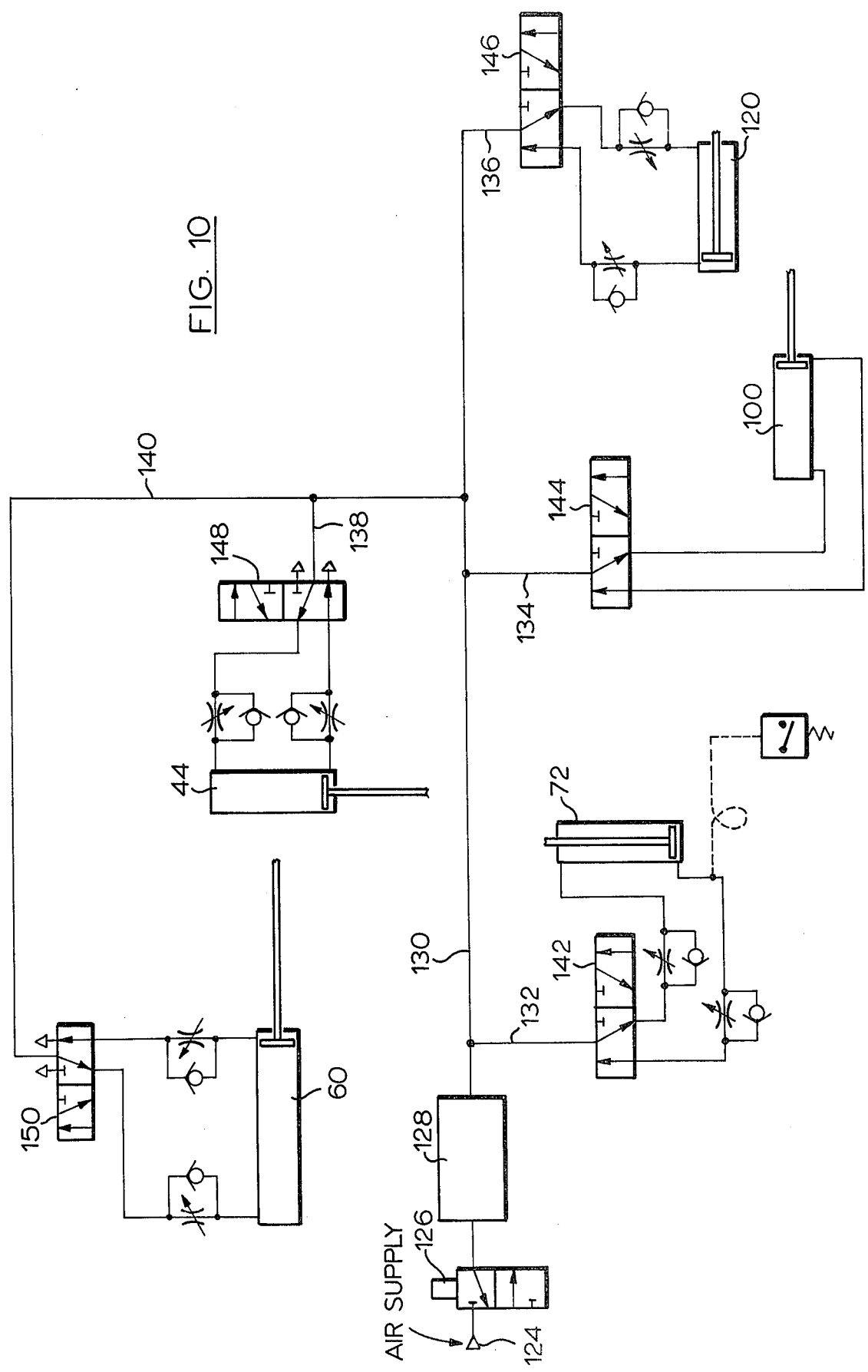
FIG. 10 is a schematic diagram of the pneumatic circuit for operation of the adhesive-applying apparatus of FIGS. 2 to 4.

A schematic representation of the pneumatic piping used in the adhesive-applying station 26 is illustrated in FIG. 10. An air supply source 124 under suitable pressure is fed through a master valve 126 and a flow control system 128 to a master line 130. From the master line 130 extend branch lines 132, 134, 136, 138 and 140 serving respectively pistons 72, 100, 120, 44 and 60 through limit switch actuated double-acting solenoid valves 142, 144, 146, 148 and 150 respectively.

Third and fourth photocells 152 and 154, or any other convenient block sensing means, are positioned in longitudinally spaced-apart relation relative to the conveyor portion 18 to sense the presence of moving blocks 70 on the conveyor portion 18 and to establish a predetermined spacing between blocks on the conveyor 12. The function and operation of the photocells 152 and 154 are described in more detail.

Figure 8:
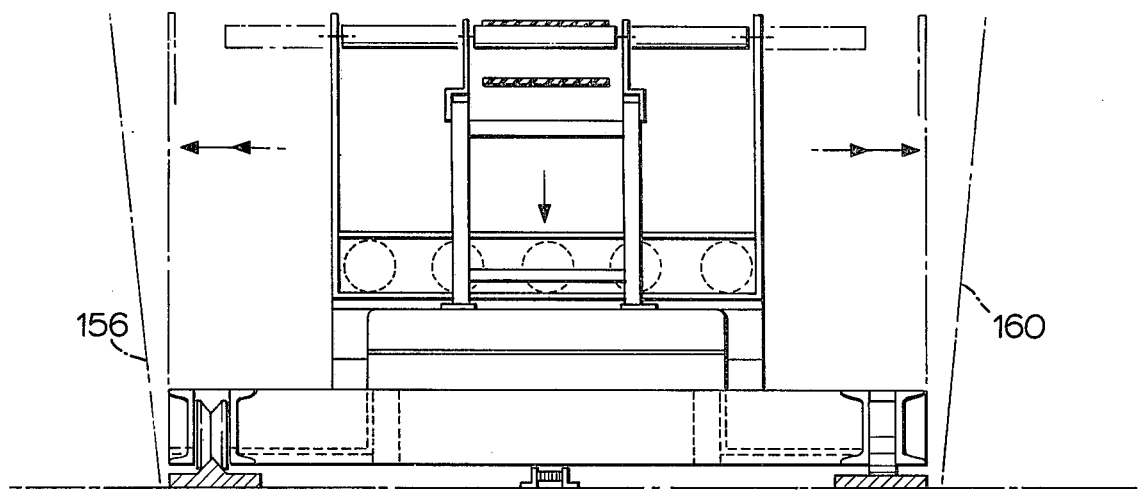
FIG. 8 is a front elevational view of the building platform of FIG. 7.
Figure 9:
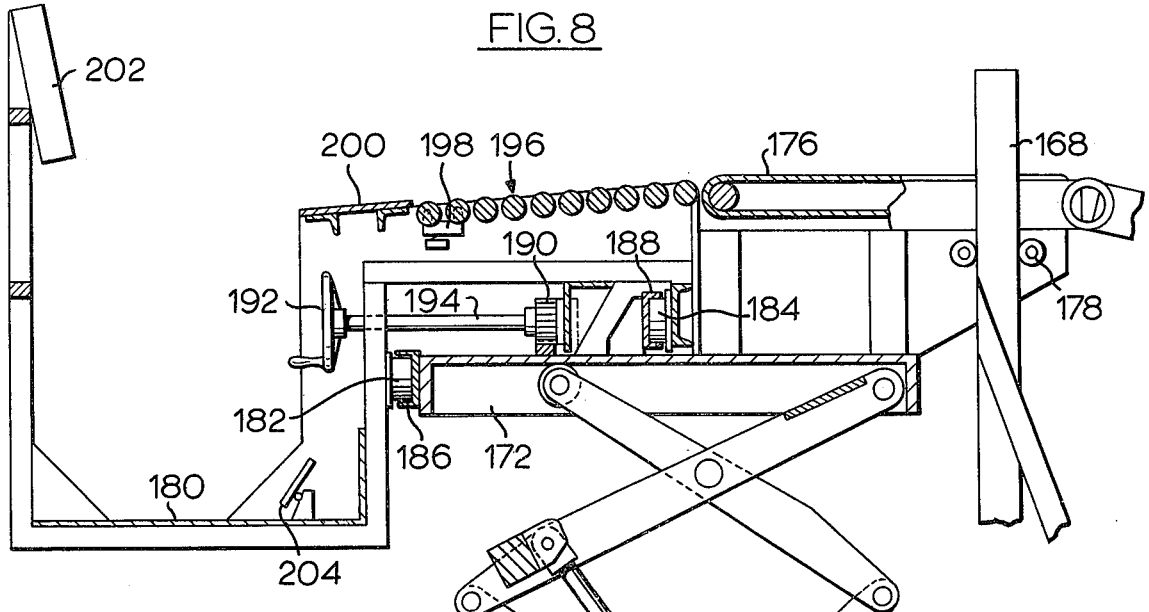
FIG. 9 is a part-sectional side elevational view of the building platform of FIG. 7.
Figure 7:
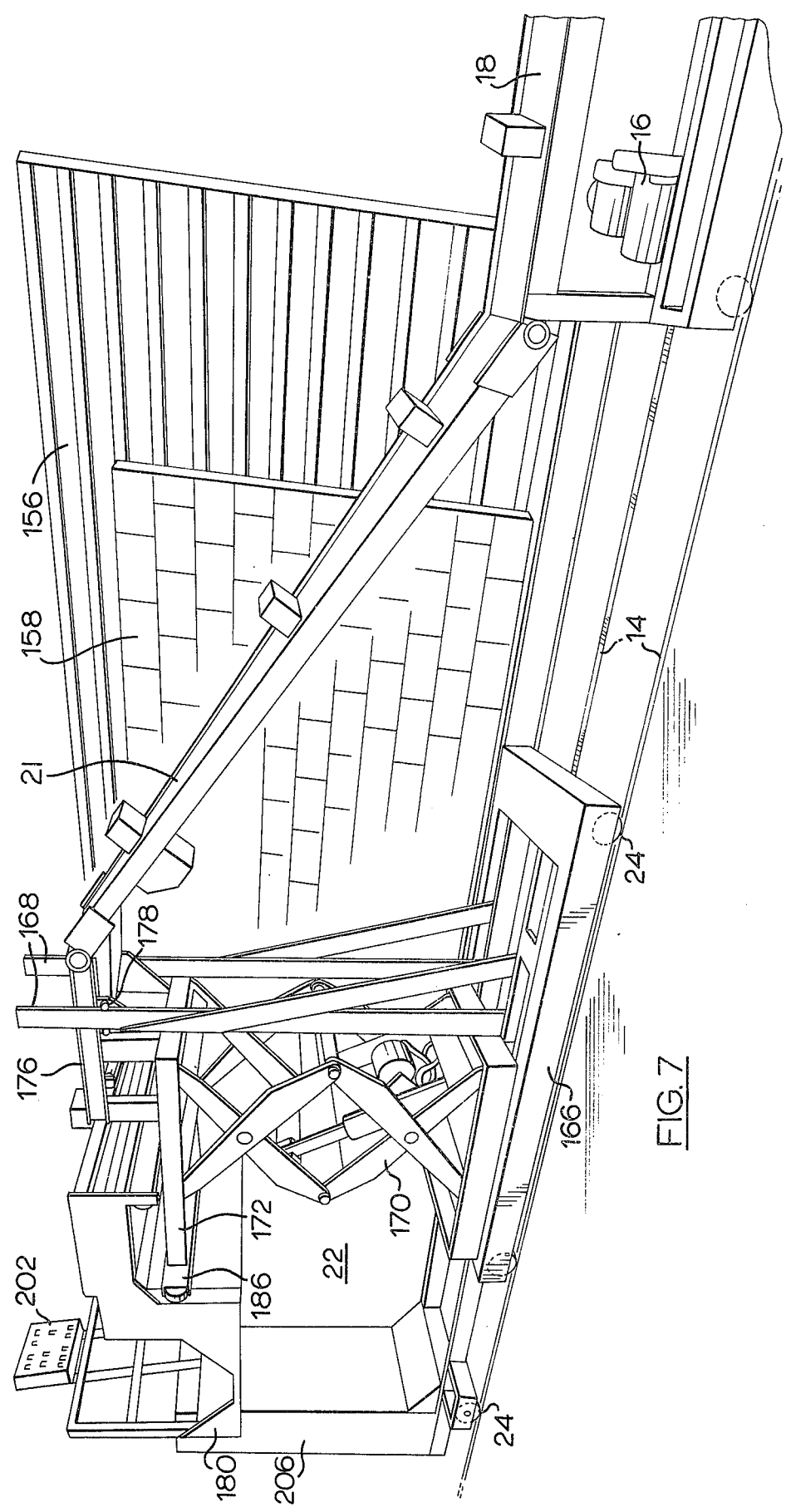
FIG. 7 is a perspective view of a panel building platform for use in the apparatus of FIG. 1.

Turning now to consideration of FIGS. 7 to 9, there is shown in detail the construction of the platform assembly 22 and its juxtaposition and relation to its environment. The platform assembly 22 is intended to be movable longitudinally along the tracks 14 at an operator-controlled speed relative to a stationary panelization frame of jig 156 on which a prefabricated panel 158 may be formed. A further panelization frame or jig 160 usually is positioned on the other lateral side of the platform assembly 22 from the building frame 156, on which a further panel may be prefabricated. More than one panel 158, typically up to three, may be formed on each jig 156, 160 if desired by superimposing one panel on another.

The panelization frames 156 and 160 may be of any convenient form and generally the building face is inclined to the vertical away from the platform assembly 22 as may be seen from FIG. 7. The panelization frames 156 and 160 may be provided by self-standing A-frame structures.

The limits of longitudinal travel of the platform assembly 22 are designed to correspond to the length of the frames 156 and 160 and over-running safety limit switches 162 and 164 actuated by the wheels 24 of the platform assembly 22 are provided.

The platform assembly 22 includes a base frame 166 to which is rotatably mounted the wheels 24 by which the platform assembly 22 moves on the track 14. An upright frame member 168 is rigidly mounted to the base frame 166. Also rigidly mounted on the base frame 166 is a scissors lift structure 170 of any convenient form which is hydraulically or pneumatically operated to raise and lower an upper frame member 172 by use of piston 174. The limit of upward movement of the upper frame member 172 is dictated by limit switch 173.

The upper frame member 172 supports a substantially horizontal conveyor section 176 for receiving the concrete blocks at the platform assembly 22 from the conveyor portion 20 and drivably conveying the same on the top surface thereof.

The conveyor section 176 is slidably mounted for vertical movement by wheels 178 on the upright frame members 168 for additional guiding of the upper frame member 172 during upward and downward movement thereof in response to the motion of the scissors structure 170.

A platform 180 is mounted to the upper frame member 172 for lateral movement relative thereto. The platform 180 has rollers or wheels 182 and 184 positioned in channels 186 and 188 respectively whereby the lateral movement of the platform 180 relative to the upper frame member 172 may be achieved.

A rack and pinion gear system 190, controlled by a manual actuation wheel 192 and connecting shaft 194, is used to position the platform 180 laterally with reference to the base frame 166, the platform being capable of movement to a position adjacent either panelization frame 156, 160.

The lateral motion of the platform 180 allows the operator to compensate for the greater distance from the platform of the frame members 156 and 160 at increasing height and also to compensate the thickness of successive layers built up on the frames 156 and 160.

The platform 180 has a block conveying surface 196 consisting of a series of parallely-arranged free-rolling rollers. The conveying surface 196 is inclined downwardly from the driven conveyor 176 and receives the blocks 70 from the conveyor 176 for manual building of panels 158 by an operator standing on the platform 180.

At the downstream end of the conveying surface 196 is located a limit switch 198 actuatable by the pressure of a block on the rollers located at that point to cause the conveyor 12 to stop transporting blocks to the platform assembly. The rollers concerned may be spring mounted in slots or in any convenient manner to achieve the desired switching. Once a block is removed, the conveyor 12 operates again until a new block is positioned on the switch 198. Normally the speed of delivery of the blocks to the platform assembly 22 is controlled to the building rate of the operator so that there is a substantially continuous movement of the belt 12.

A plate-like surface 200 mounted on the platform 180 downstream of the roller conveying surface 196 to receive the forward portions of the block 70 and to prevent overshooting of blocks from the conveying surface 196.

A foot-operated emergency brake switch 204 may be provided for suitable use by operator. An operator-actuated control panel 202 is mounted on the platform 180 so that a variety of operations may be carried out by actuation of the appropriate circuitry.

For example, the control panel 202 may have controls including an on-off switch for actuation of the entire system, a speed control to control the speed of the conveyor 10 and hence the speed at which blocks are received at the platform assembly 22, a speed control to control the speed of longitudinal movement of the platform assembly 22, a scissors lift mechanism actuation control and a forward and reverse control.

An electrical circuitry control box 206 is mounted on the base member 166 for reciprocal motion therewith. Electrical supply for the system may be provided in any convenient manner.

The panels 158, after sufficient time has elapsed for the adhesive to set, may be removed by an overhead crane or in any other convenient manner, for grouting and/or reinforcement as desired.

OPERATION

In operation, concrete blocks 70, after grinding the upper and lower surfaces thereof, is required, to provide smooth bedding planes, are placed on the first portion 28 of the conveyor 10 by a first operator 208 in indexed manner in the order the blocks are to be used in the structural panel 158. The blocks 70 placed on the conveyor portion 28 may be of any desired form, preferably as described in U.S. copending application Ser. No. 295,896 referred to above, including blocks of standard length having recesses in both end faces, blocks of standard length having a recess in only one end face, for use as an end-block and blocks of about half the standard length having a recess in only one end face, also for use as an end block.

Figure 5:
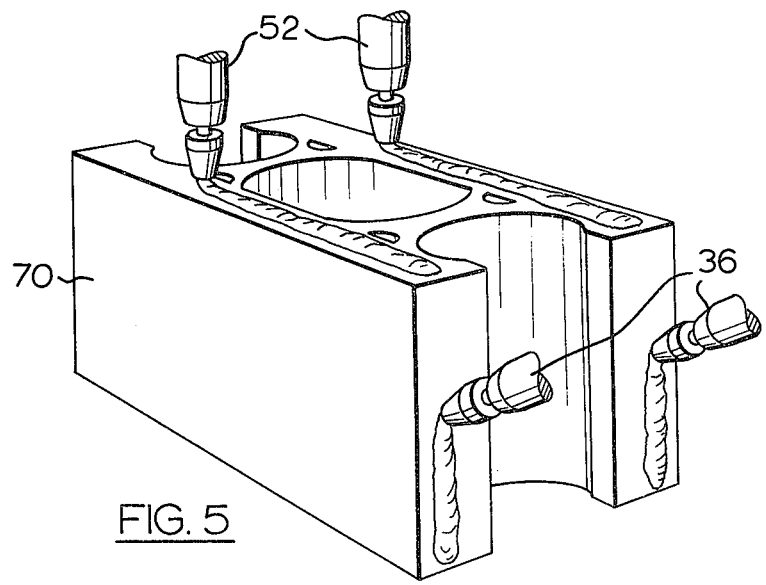
FIG. 5 is a perspective view of a masonry block having adhesive applied thereto.

The blocks 70 are gravity fed to the driven rollers 86 and 87 which position the lead block in the adhesive-applying station 26 against the gate plate 94 which projects above the plane of the surface of the rollers 86. The first photocell 114 senses the presence of a block in the adhesive-applying station and causes the drive of rollers 86 and 87 to cease. The pusher plate 74 is actuated to situate the block in its adhesive-applying position. Normally a standard length block has adhesive applied to its upper and side peripheral edges, as illustrated in FIG. 5 by the guns 36 and 52. However, the adhesive-applying mechanism may be controlled by a selector switch, not shown, to apply adhesive to the upper edges only, the side edges only or not at all, depending on the form and requirement of the block.

For example, a course end block will require no adhesive on its side edges whereas a top course block will require no adhesive on its upper edges and a top course end block will require no adhesive at all.

Additionally, the limit switch 84 associated with the pusher 74 is intended to sense the presence of a half-length block and actuate circuitry to cause limit switch 64 to constitute the transverse extremity of movement of the guns 52.

The adhesive-applying station 26 thereby applies adhesive automatically to the blocks in whatever manner is desired for the particular type of block and its intended position in the panel 158.

When the apparatus is in continuous operation when a block is situated at the adhesive-applying station, another block, to which adhesive has previously been applied, is situated on the second portion 30 of the conveyor 10 against the escapement plate 116 and a further block, previously transferred thereto from the conveyor 10, is transported by the moving conveyor belt 18 between the photocells 152 and 154.

When the block on the moving conveyor belt 18 is sensed by the photocell 154 as it passes the same, the escapement plate 116 is opened allowing the block retained thereby to pass from the second portion 30 of the conveyor 10 onto the moving conveyor belt 18.

When the latter block is sensed by the photocell 152, which signifies the presence of that block on the moving conveyor belt 18, the escapement plate 116 is reclosed.

At the same time, the gate plate 94 is retracted below the plane of the surface of the rollers 86 and upon actuation of the limit switch 112 the rollers 87 recommence rotation and eject the block to which adhesive has been applied onto the second portion 30 of the conveyor 10, its presence thereon being sensed by the photocell 124 positioned one block-widths distance downstream of the photcell 114.

After the block to which adhesive has been applied has moved out of the adhesive-applying station 30 as sensed by the photocell 124, the gate plate 94 returns to its original position to stop the next block fed to the adhesive-applying station 26, and the procedure is repeated.

The conveyed block, after being carried past the photocell 154, is transported by the moving surfaces of the conveyor portions 18 and 20 to the platform assembly 22 and onto the rollers 196 and plate 200 thereof.

A block positioned on the skid plate 200 and engaging the rollers associated with the limit switch 198 prevents further motion of the conveyor 12 until the block has been removed. An operator 210 removes the block from the skid plate 200 and positions it appropriately on the panel 158 he is constructing. Upon the removal of the block, the conveyor 12 recommences the forwarding of blocks to the platform 22.

As indicated above, however, usually the rate of delivery of the blocks to the skid plate 200 is controlled by controlling the speed of operation of the conveyor 12 to conform to the building rate of the operator, so that the conveying surface of the conveyor 12 is in substantially continuous motion and there is a substantially continuous flow of blocks to the platform assembly 22.

The operator 210 positions the platform 180 in an appropriate vertical location by actuation of the scissors lift mechanism and an appropriate lateral location by actuation of the rack and pinion mechanism 190 by use of the wheel 192.

The operator 210 builds up the desired panel 158 usually a course at a time. The drive motor 16 is actuated for each block removed from the plate 200 hence moving the platform assembly 22 on the track 14 relative to the length of the panelization frames 156, 160. For a synchronous rate of removal of the blocks from plate 200, the motion of the platform assembly 22 is continuous. The longitudinal movement of the platform assembly 22 causes longitudinal movement of the conveyor 12 on the track 14 from one side extremity of the panel 158 to the other during the building of each course. As the platform assembly 22 moves towards the adhesive-applying station 26, the conveyor portion 18 is wheeled under the conveyor 10 and, during movement of the platform assembly 22 away from the adhesive-applying station 26, the conveyor platform 18 is wheeled out from under the conveyor 10.

This motion during the building of a course would normally result in blocks arriving at a slower or faster rate at the skid plate 200 depending on the relative speeds and directions of travel of the platform assembly 22 and the conveyor feeding the adhesive-applying station 26. In the present invention, the photocells 152 and 154 and the escapement plate 116 operate to maintain a substantially constant flow rate of blocks to the plate 200 at a predetermined spacing irrespective of the direction of travel of the platform assembly 22 and the relative speeds of the conveyor 12 and the conveyor feeding the adhesive-applying station 26.

Since the opening of escapement 116 and hence the positioning of a block on the moving conveyor 12 is achieved by actuation of the photocell 154 when a block passes the same, and the closure thereof and the movement of a further block into the escapement is achieved by actuation of the photocell 152, the rate of feed of blocks onto the moving conveyor 12 is varied depending on the relative position of the block immediately upstream the photocell 154 and the photocell itself at any one time.

In this way, the blocks reach the builder 210 at a substantially constant rate which he may adjust to suit his work speed by altering the speed of the conveyor belt 12. In addition, he may adjust the speed of longitudinal movement of the platform assembly 22 along the track 14.

SUMMARY

It will be seen, therefore, that the present invention provides panelization equipment allowing the accurate production of prefabricated structural panels utilizing a minimum of labour and possessing a high degree of uniformity due to the automatic adhesive application.

Modifications are possible within the scope of the invention.

What I claim is:

1. An apparatus for use in the building of structural components which comprises:
first longitudinally extending conveyor means having a building block conveying surface and a discharge end, said first conveyor means having a substantially fixed position;
second longitudinally extending conveyor means having a building-block conveying surface and a discharge end and being situated to receive building blocks from said discharge end of said first conveyor means,
fixed location track means extending in the same longitudinal direction as said first conveyor means,
first-mounting means mounting said second conveyor means on said track means for movement longitudinally thereof and longitudinally of said first conveyor means to provide a variable portion of said second conveyor means vertically below said first conveyor means,
adhesive applying means located in substantially fixed position adjacent to and upstream from said discharge end of said first conveyor means for applying adhesive to selected portions of selected surfaces of building blocks situated on said first conveyor means prior to discharge of the same to said second conveyor means;
platform assembly means located at said discharge end of said second conveyor means and articulated thereto for receiving building blocks therefrom,
second mounting means mounting said platform means on said track means for movement of said platform means with said second conveyor means on said track means, stop means located at said discharge end of said first conveyor means for selectively preventing and allowing discharge of a block from said first conveyor means to said second conveyor means,
first and second block sensing means longitudinally spaced apart from each other and located adjacent said second conveyor means for sensing the presence of blocks thereon, said first and second block sensing means being located in fixed positions spaced from and downstream of said discharge end of said first conveyor means with said first block sensing means being spaced a distance from said discharge end of said first conveyor means which is greater then said second block sensing means,
said first block sensing means actuating the opening of said first stop means to allow passage of a block from said first conveyor means to said second conveyor means when a block conveyed on said second conveyor means passes said first sensing means,
said second block sensing means actuating the closure of said first stop means when a block conveyed on said second conveyor means passes said second sensing means,
at least one panelization frame on which said structureal unit is to be built situated in substantially fixed position adjacent said platform assembly means and extending in the longitudinal direction of said first and second conveyor means; and
drive means for simultaneously longitudinally moving said second conveyor means and platform assembly means on said track means relative to said fixed location first conveyor means, first and second block sensing means and at least one panelization frame.

2. The apparatus of claim 1 wherein said second conveyor means includes a first portion thereof, at least adjacent said first conveyor means, extending substantially horizontally beneath said first conveyor means.

3. The apparatus of claim 1 wherein said first conveyor means includes a first portion thereof sloping downwardly towards said discharge end of said first conveyor means and providing a gravity feed surface for conveying building blocks, second substantially horizontal portion parallel to but vertically upwardly displaced from the plane of said first portion of said second conveyor and located at the location of said adhesive-applying means, said second horizontal portion having a driven surface for conveying building blocks therealong, and a third portion inclined downwardly from said second horizontal portion to said discharge end located substantially adjacent said first portion of said second conveyor means.

4. The apparatus of claim 1 wherein said platform assembly means includes a frame means and a vertically movable platform mounted on said frame means and said second conveyor means includes a second portion thereof including said discharge end thereof, pivotally connected at one end to said platform assembly means and at the other end to said first portion of said second conveyor means for movement of inclined positions with respect to said first portion of said second conveyor means upon vertical movement of said platform means.

5. The apparatus of claim 4 wherein said platform also is movable transversely to the longitudinal extension of said second conveyor means and to said frame means.

6. The apparatus of claim 5 wherein there are two panelization frames extending one on each side of said platform assembly means and longitudinally of said second conveyor means, each of said panelization frames having an A-frame cross section.

7. The apparatus of claim 5, wherein said platform includes a building block-receiving and supporting surface and including switch means associated with said latter surface connected with said drive means for actuation thereof in the absence of a building block on said latter surface and for stopping said drive means when a building block is located on said latter surface.

8. The apparatus of claim 1 including third and fourth block sensing means, said third block sensing means being associated with said adhesive-applying means for sensing the presence of a block at said adhesive-applying means, said fourth block sensing means being located downstream of said third block sensing means and upstream of said discharge end of said first conveyor means for sensing the movement of blocks downstream of said adhesive-applying means.

9. The apparatus of claim 3 including second stop means located at the downstream end of said second horizontal conveyor portion for selectively preventing and allowing passage of a block from said second conveyor portion to said third conveyor portion.

10. The apparatus of claim 9 wherein said second block sensing means actuates the opening of said second stop means to allow passage of a block from said second conveyor portion to said third conveyor portion upon said closure of said first stop means when a block conveyed on said second conveyor means passes said second sensing means.

11. The apparatus of claim 10 including third block sensing means located downstream of said second conveyor portion and upstream of the discharge end of said third conveyor portion, said third block sensing means actuating the closure of said second stop means when a block passing from said second conveyor portion of said third conveyor portion passes said third sensing means.

* * * * *